(12) United States Patent
Zheng et al.

(10) Patent No.: US 9,575,322 B2
(45) Date of Patent: Feb. 21, 2017

(54) DISPLAY DEVICE AND ELECTRONIC APPARATUS

(71) Applicant: Lenovo (Beijing) Co., Ltd., Beijing (CN)

(72) Inventors: Xiaopan Zheng, Beijing (CN); Feijun Weng, Beijing (CN); Fei Wu, Beijing (CN); Zhenrong Zheng, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 77 days.

(21) Appl. No.: 14/584,700

(22) Filed: Dec. 29, 2014

(65) Prior Publication Data

US 2015/0378165 A1 Dec. 31, 2015

(30) Foreign Application Priority Data

Jun. 26, 2014 (CN) .......................... 2014 1 0295587

(51) Int. Cl.
*G02B 27/14* (2006.01)
*G02B 27/01* (2006.01)
*G02B 27/28* (2006.01)

(52) U.S. Cl.
CPC ....... *G02B 27/0179* (2013.01); *G02B 27/0172* (2013.01); *G02B 27/281* (2013.01); *G02B 27/283* (2013.01); *G02B 2027/0178* (2013.01)

(58) Field of Classification Search
CPC .............................................. G02B 2027/0178
USPC ......................................................... 359/633
See application file for complete search history.

(56) References Cited

U.S. PATENT DOCUMENTS

| | | | |
|---|---|---|---|
| 2015/0323788 A1* | 11/2015 | Zou | G02B 27/0101 359/630 |
| 2015/0378164 A1* | 12/2015 | Bailey | G02B 27/30 359/633 |

\* cited by examiner

*Primary Examiner* — James Jones
(74) *Attorney, Agent, or Firm* — Brinks Gilson & Lione; G. Peter Nichols

(57) ABSTRACT

A display device and an electronic apparatus using the display device are described. The display device includes a display component configured to output initial light corresponding to a first image; and a transmission optical component at least partially provided within an irradiation area of the initial light and configured to transmit the initial light corresponding to the first image from the display component and perform light path conversion to convert it into a first exit light; and an adjustment optical component at least partially provided within an irradiation area of the first exit light and configured to perform light path conversion on the first exit light to obtain a second exit light, wherein an image corresponding to the first image is capable of being perceived at a particular position.

12 Claims, 11 Drawing Sheets

DISPLAY DEVICE AND ELECTRONIC APPARATUS

This application claims priority to Chinese patent application No. 201410295587.3 filed on Jun. 26, 2014 the entire contents of which are incorporated herein by reference.

The present application relates to the field of display device, and more particularly, to a display device including a micro-display.

BACKGROUND

At present, an electronic apparatus is often equipped with a conventional display, such as liquid crystal display (LCD), organic electroluminescent display, organic light emitting diode (OLED) display etc. When size of the electronic apparatus itself is limited (e.g., the electronic apparatus is a wearable electronic apparatus like a smart watch, smart glasses or an HMD (head-mounted display) device, if equipped with only a conventional display, usually its display area is quite small, only limited information can be displayed.

It is therefore desirable to provide a display device that can reduce the volume and weight of the display device, and distribute layouts of the respective components in the display device in accordance with human engineering so as to achieve an overlapped proper distribution, thus providing the user with more comfortable wearing experience.

SUMMARY

According to an embodiment of the present application, there is provided a display device, comprising: a display component configured to output initial light corresponding to a first image; a transmission optical component at least partially provided within an irradiation area of the initial light and configured to transmit the initial light corresponding to the first image from the display component and perform light path conversion to convert it into a first exit light; and an adjustment optical component at least partially provided within an irradiation area of the first exit light and configured to perform light path conversion on the first exit light to obtain a second exit light, wherein an image corresponding to the first image is capable of being perceived at a particular position.

In addition, in the display device according to the embodiment of the present application, wherein the transmission optical component comprises a converging unit and a first light guide unit, the converging unit is configured to narrow an initial beam diameter of the initial light corresponding to the first image from the display component as a first beam diameter, the first light guide unit guides the first exit light having the first beam diameter to the adjustment optical component.

In addition, in the display device according to the embodiment of the present application, wherein the transmission optical component enables the display component and the adjustment optical component to be located at different relative positions.

In addition, in the display device according to the embodiment of the present application, wherein the adjustment optical component comprises a collimating unit and a waveguide unit, the collimating unit is configured to collimate the first exit light from the transmission optical component into collimated light corresponding to the first image, and lead the same into the waveguide unit; the waveguide unit guides the collimated light corresponding to the first image from the collimating unit to the particular position, wherein the collimated light corresponding to the first image is for forming a virtual image corresponding to the first image, and a size of the virtual image is greater than a display size of the display component.

In addition, in the display device according to the embodiment of the present application, wherein the collimating unit comprises a first collimating subunit and a second collimating subunit provided opposite to each other, and a polarization beam splitting subunit provided between the first collimating subunit and the second collimating subunit, the first exit light is reflected by the polarization beam splitting subunit to the first collimating subunit, thereafter it is collimated by the first collimating subunit and the second collimating subunit, and exited by the polarization beam splitting unit as the collimated light corresponding to the first image.

In addition, in the display device according to the embodiment of the present application, wherein the collimating unit comprises a polarization beam splitting subunit and a collimating-amplifying subunit, the first exit light transmits through the polarization beam splitting subunit, is collimated by the collimating-amplifying subunit, and thereafter is reflected by the polarization beam splitting subunit as the collimated light corresponding to the first image to be exited.

In addition, in the display device according to the embodiment of the present application, wherein the display component comprises: a light emitting unit configured to emit backlight towards a first direction; and a display unit provided within an irradiation area of the backlight, and configured to generate the initial light corresponding to the first image based on the first image, wherein the display component further comprises a second light guide unit provided between the light emitting unit and the display unit and configured to lead the light emitted by the light emitting unit to the display unit.

In addition, in the display device according to the embodiment of the present application, wherein the adjustment optical component further comprises a third light guide unit provided between the collimating unit and the waveguide unit and configured to lead the collimated light corresponding to the first image from the collimating unit to the wave guide unit.

According to another embodiment of the present application, there is provided an electronic apparatus, comprising: a body device that comprises a processing unit configured to generate a first image to be displayed and execute display control; a fixing device connected with the body device and configured to fix a position relationship relative to a user of the electronic apparatus; and a display device provided within the body device and/or the fixing device, wherein the display device comprises: a display component configured to output initial light corresponding to the first image; a transmission optical component at least partially provided within an irradiation area of the initial light and configured to transmit the initial light corresponding to the first image from the display component and perform light path conversion to convert it into a first exit light; and an adjustment optical component at least partially provided within an irradiation area of the first exit light and configured to perform light path conversion on the first exit light to obtain a second exit light, wherein an image corresponding to the first image is capable of being perceived at a particular position, wherein the display component is located ac a first position in the electronic apparatus, the adjustment optical component is located at a second position in the electronic apparatus, there is a separation between the first position and the second position.

In addition, in the electronic apparatus according to another embodiment of the present application, wherein the transmission optical component comprises a converging unit and a first light guide unit, the converging unit is configured to narrow an initial beam diameter of the initial light corresponding to the first image from the display component as a first beam diameter, the first light guide unit guides the first exit light having the first beam diameter to the adjustment optical component.

In addition, in the electronic apparatus according to another embodiment of the present application, wherein the transmission optical component enables the display component and the adjustment optical component to be located at different relative positions.

In addition, in the electronic apparatus according to another embodiment of the present application, wherein the body device and the fixing device can move relatively, the first position and the second position are located within the fixing device and the body device, respectively.

The display device according to the embodiment of the present application and the electronic apparatus using the display device can reduce the volume and weight of the display device, and distribute layouts of the respective components in the display device in accordance with human engineering so as to achieve an overlapped proper distribution, thus providing the user with more comfortable wearing experience.

It is to be understood that both the foregoing general descriptions and the following detailed descriptions are exemplary and intended to provide further explanation of the claimed technique.

DETAILED DESCRIPTION

Hereinafter, preferred embodiments of the present application will be described in detail with reference to the accompanying drawings.

First, a display device according to an embodiment of the present application will be described with reference to FIGS. 1 to 7. The display device according to an embodiment of the present application may be applied to any electronic apparatus that comprises a display device, and it may be a wearable electronic apparatus or any other type of electronic apparatus. Those skilled in the art will readily appreciate that, in the case of applying the display device according to an embodiment of the present application to a wearable electronic apparatus, the wearable electronic apparatus may be, but not limited to, a headset electronic apparatus.

Figure 1:
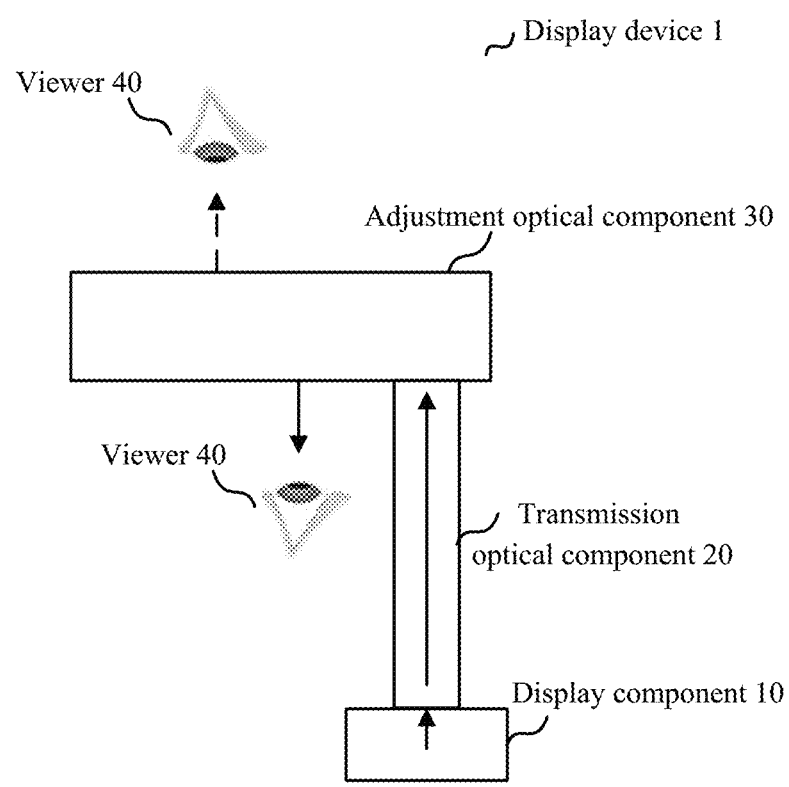
FIG. 1 is a schematic diagram briefly illustrating a display device according to an embodiment of present application.

FIG. 1 is a schematic diagram briefly illustrating a display device according to an embodiment of present application. As shown in FIG. 1, the display device 1 according to an embodiment of the present application comprises a display component 10, a transmission optical component 20, and an adjustment optical component 30. The display component 10 is configured to output initial light (light indicated by the solid-line arrow shown in FIG. 1) corresponding to a first image to be displayed by the display device 1. The transmission optical component 20 is at least partially provided within an irradiation area of the initial light and configured to transmit the initial light corresponding to the first image from the display component 10 and perform light path conversion to convert it into a first exit light. The adjustment optical component 30 is at least partially provided within an irradiation area of the first exit light and configured to perform light path conversion on the first exit light to obtain a second exit light, so that a viewer 40 at a particular position perceives an image corresponding to the first image.

Specifically, in a preferred embodiment of the present application, the display component 10 may be for example a self-luminous type display component like an organic light emitting diode (OLED) display, may also be a backlight type display component like a liquid crystal display. The adjustment optical component 30 may comprise a lens group for collimating and amplifying an image and a waveguide chip or a flexible waveguide for changing an exit direction of the image and so on. Further, the viewer 40 at a particular position can perceive an image corresponding to the first image. In particular, image can be formed at a particular position through the adjustment optical component 30 as needed by design, for example, as shown in FIG. 1, the particular position may be either side relative to the adjustment optical component 30 (internal configuration of the adjustment optical component 30 that forms image towards the particular position will be described in detail below).

In a preferred embodiment of the present application, the display component 10 and the adjustment optical component 30 are further configured with the transmission optical component 20. Different than the configuration of direct engagement of the display component and the optical component, in a preferred embodiment according to the present application, the transmission optical component 20 enables that the position of each of the display component 10 and the adjustment optical component 30 can be properly configured as needed, for example, the display component 10 and the adjustment optical component 30 may be located at different positions that are separated by a specific distance in the whole device. Further, the transmission optical component 20 may be configured with flexible material such as flexible fiber, so that the relative position between the display component 10 and the adjustment optical component 30 may be changed freely according to a different state of wearing. And still further, the transmission optical component 20 may be configured with an optical component having a beam converging function, so that a diameter or an entire volume of a connecting component between the display component 10 and the adjustment optical component 30 can be reduced notably. Hereinafter, specific configuration of the transmission optical component 20 according to a preferred embodiment of the present application will be further described with reference to FIGS. 2 and 3.

Figure 2:
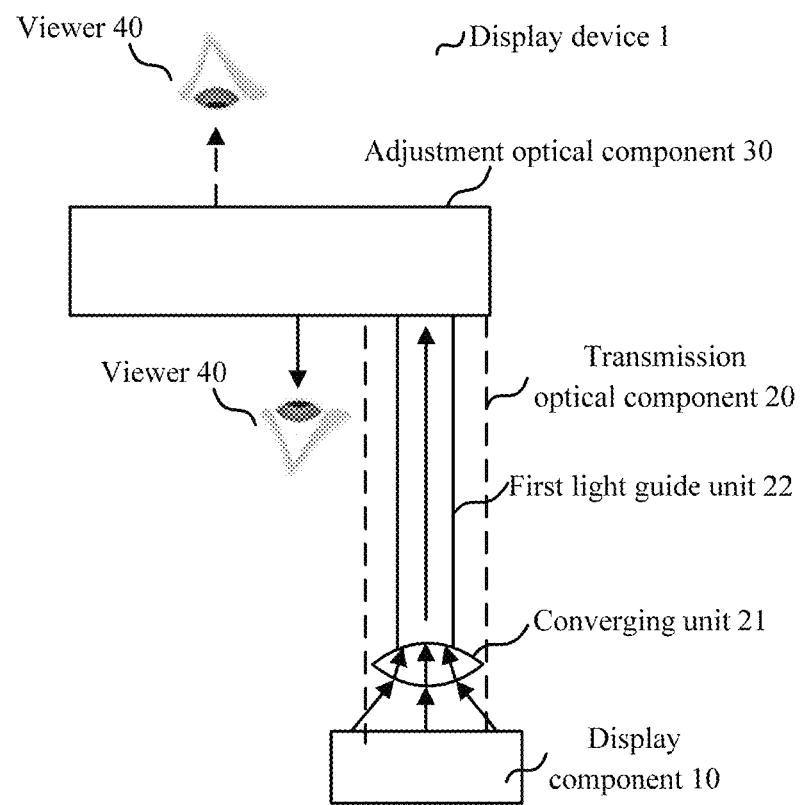
FIG. 2 is a structural block diagram illustrating a display device according to a first exemplary embodiment of the present application.

FIG. 2 is a structural block diagram illustrating a display device according to a first exemplary embodiment of the present application. Similar to the display device according to an embodiment of the present application as briefly illustrated in FIG. 1, the display device 1 according to the first exemplary embodiment of the present application comprises a display component 10, a transmission optical component 20, and an adjustment optical component 30. Specifically, the transmission optical component 20 of the display device 1 according to the first exemplary embodiment of the present application further comprises a converging unit 21 and a first light guide unit 22.

The converging unit 21 is for example configured with a converging lens or a lens group, and it is configured to narrow an initial beam diameter of the initial light corresponding co the first image from the display component 10 as a first beam diameter. The first light guide unit 22 guides the first exit light having the first beam diameter to the adjustment optical component 30. As such, the converging unit 21 enables that a diameter or an entire volume of a connecting portion other than the display component 10 and the adjustment optical component 30 can be reduced notably in the display device 1 according to the first exemplary embodiment of the present application. The first light guide unit 22 enables the display component 10 and the adjustment optical component 30 to be located at different positions that are separated by a specific distance in the whole device, thus the respective components of the whole display device 1 are not stacked at the same position, so that the weight of the display device 1 can be properly assigned as needed by design.

Figure 3:
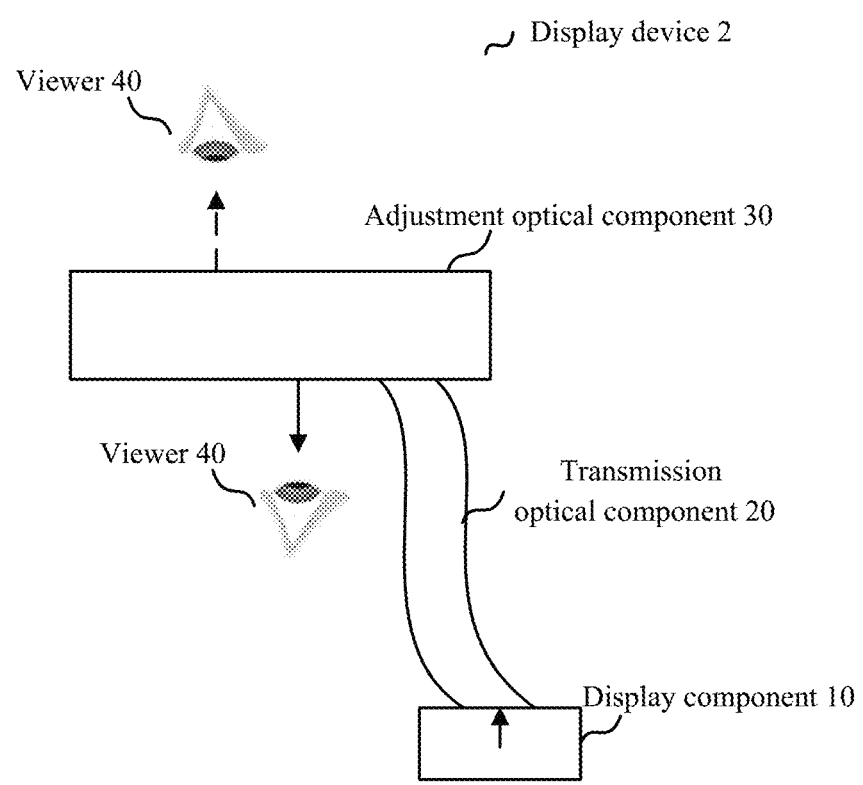
FIG. 3 is a structural block diagram illustrating a display device according to a second exemplary embodiment of the present application.

FIG. 3 is a structural block diagram illustrating a display device according to a second exemplary embodiment of the present application. Similar to the display device according to an embodiment of the present application as briefly illustrated in FIG. 1, the display device 2 according to the second exemplary embodiment of the present application comprises a display component 10, a transmission optical component 20, and an adjustment optical component 30. Specifically, the transmission optical component 20 is configured with flexible material, so that the display component 10 and the adjustment component 30 can be located at different relative positions. When the display device 2 is applied to a wearable electronic apparatus, the transmission optical component 20 enables that the relative positions between the respective components (such as the display component 10 and the adjustment optical component 30) of the display device 2 can be changed flexibly according to a different wearing state of the wearable electronic apparatus. Thus, the display device 2 may be configured at different positions of an electronic apparatus, rather than being configured integrally in the electronic apparatus, detailed description will be further provided below with reference to the drawings.

Figure 4:
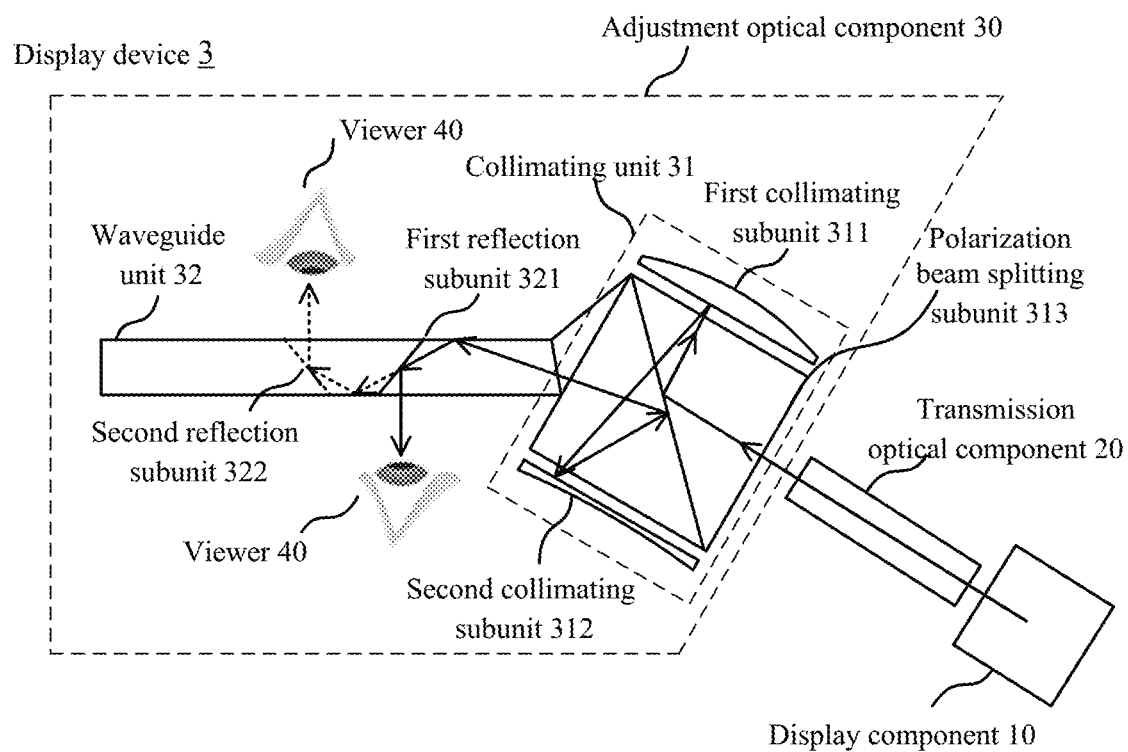
FIG. 4 is a structural block diagram illustrating a display device according to a third exemplary embodiment of the present application.

FIG. 4 is a structural block diagram illustrating a display device according to a third exemplary embodiment of the present application. Similar to the display device according to an embodiment of the present application as briefly illustrated in FIG. 1, the display device 3 according to the third exemplary embodiment of the present application comprises a display component 10, a transmission optical component 20, and an adjustment optical component 30.

Specifically, the adjustment optical component 30 comprises a collimating unit 31 and a waveguide unit 32. The collimating unit 31 is configured to collimate the first exit light from the transmission optical component 20 into collimated light corresponding to the first image, and lead the same into the waveguide unit 32. The waveguide unit 32 guides the collimated light corresponding to the first image from the collimating unit 31 to the particular position, wherein the collimated light corresponding to the first image is for forming a virtual image corresponding to the first image, and a size of the virtual image is greater than a display size of the display component.

Specifically, the collimating unit 31 comprises a first collimating subunit 311 and a second collimating subunit 312 provided opposite to each other, and a polarization beam splitting subunit 313 provided between the first collimating subunit 311 and the second collimating subunit 312, the first exit light from the transmission optical component 20 is firstly reflected by the polarization beam splitting subunit 313 to the first collimating subunit 311, thereafter it is collimated by the first collimating subunit 311 and the second collimating subunit 312, and exited by the polarization beam splitting subunit 313 as the collimated light corresponding to the first image. The waveguide unit 32 guides the collimated light corresponding to the first image from the collimating unit 31 to the particular position, wherein the collimated light corresponding to the first image is for forming the virtual image corresponding to the first image. In a preferred embodiment of the present application, the first collimating subunit 311 and the second collimating subunit 312 may be a single lens or a lens group as needed by design. It is possible to implement adjustment of a size of the virtual image corresponding to the first image by adjusting the relative position of the lens or lens group by which the first collimating subunit 311 and the second collimating subunit 312 are configured.

In addition, as shown in FIG. 4, the waveguide unit 32 further comprises a first reflection subunit 321 and/or a second reflection subunit 322, it is possible to control to guide the collimated light from the collimating unit 31 and corresponding to the first image to the particular position to exit, by setting the position and angle of the first reflection subunit 321 and/or the second reflection subunit 322. In a first case, the collimating unit 31 and the display component 10 are located at a first side relative to the plane on which the waveguide unit 32 is located, when the first reflection subunit 321 as shown in FIG. 4 is provided, it is possible to exit towards the first side. In a second case, when the second reflection subunit 322 as shown in FIG. 4 is provided, the collimated light corresponding to the first image may exit towards a second side relative to the plane on which the waveguide unit 32 is located, the first side and the second side are opposite sides relative to the plane on which the waveguide unit is located. Specifically, when the display device is applied to for example a head-mounted electronic apparatus, it is possible to adopt the configuration example in the first case, the collimated light corresponding to the first image is made to exit cowards the first side, that is, the collimated light is made to exit towards the eyes of a user wearing the head-mounted electronic apparatus. When the display device is applied to for example a wrist-mounted electronic apparatus, it is possible to adopt the configuration example in the second case, the collimated light corresponding to the first image is made to exit towards the second side, that is, the collimated light is made to exit towards the eyes of a user wearing and viewing the wrist-mounted electronic apparatus. In addition, it will be further explained below in detail that the exit direction of the display device can be set as required by viewing, for example, rotation of the first reflection subunit 321 and/or the second reflection subunit 322 may be controlled, so as to control the exit direction of the first reflection subunit 321 and/or the second reflection subunit 322, thus achieving a switch of bi-directional display of the display device.

Therefore, in the display device according to the third exemplary embodiment of the present application, in the collimating unit 31, a folded imaging light path between the first collimating subunit 311 and the second collimating subunit 312 is implemented by using the polarization beam splitting subunit 313, thereby an overall size of the display device is reduced.

Figure 5A:
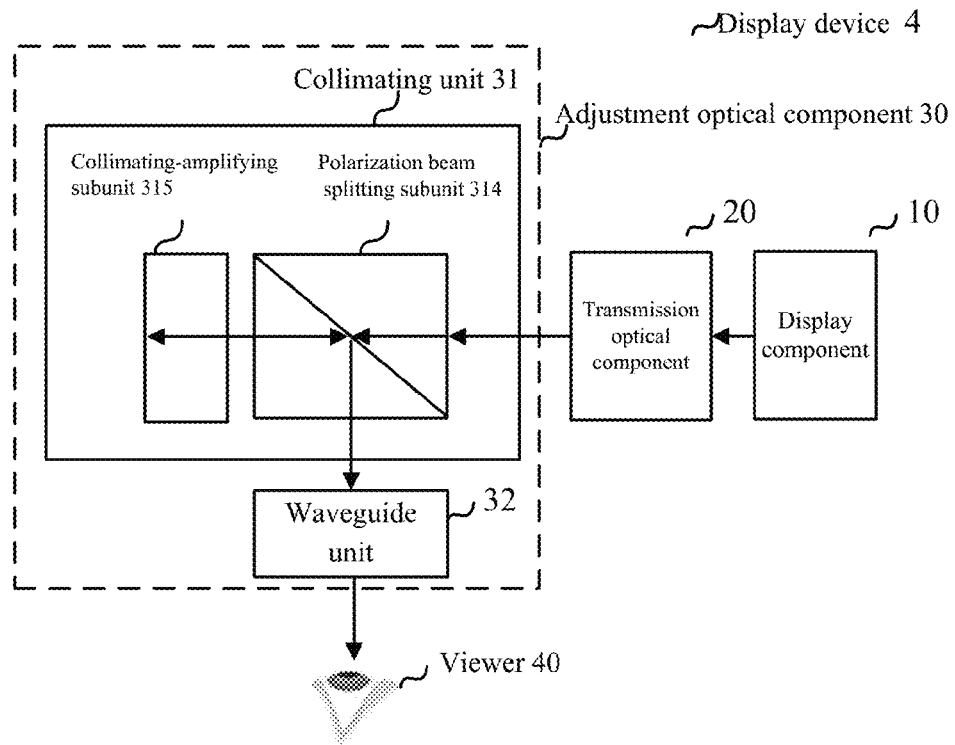
FIGS. 5A and 5B are structural block diagrams respectively illustrating a display device according to a fourth exemplary embodiment of the present application and a display device according to a fifth exemplary embodiment of the present application.
Figure 5B:
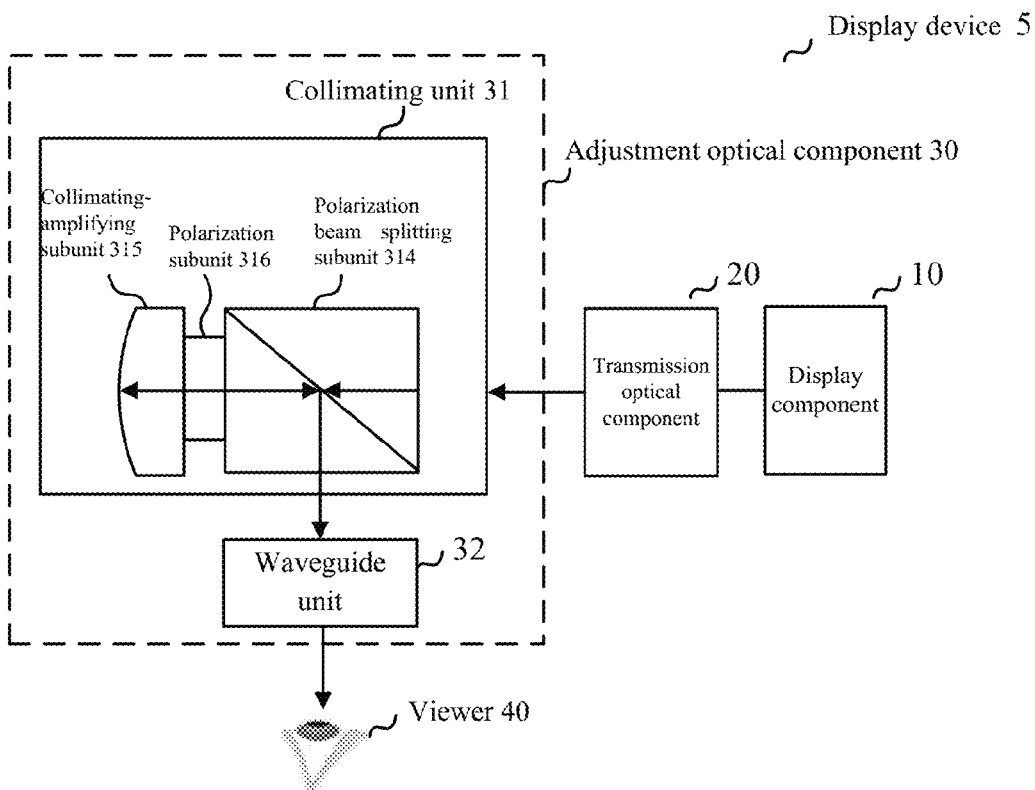

FIGS. 5A and 5B are structural block diagrams respectively illustrating a display device according to a fourth exemplary embodiment of the present application and a display device according to a fifth exemplary embodiment of the present application. Similar to the display device according to an embodiment of the present application as briefly illustrated in FIG. 1, the display device 4 according to the fourth exemplary embodiment of the present application and the display device 5 according to the fifth exemplary embodiment of the present application each comprise a display component 10, a transmission optical component 20, and an adjustment optical component 30.

Specifically, as shown in FIG. 5A, the collimating unit 31 in the adjustment optical component 30 according to the fourth exemplary embodiment of the present application comprises a polarization beam splitting subunit 314 and a collimating-amplifying subunit 315. In particular, the first exit light from the transmission optical component 20 transmits through the polarization beam splitting subunit 314, is collimated by the collimating-amplifying subunit 315, and thereafter is reflected by the polarization beam splitting subunit 314 as the collimated light corresponding to the first image to be exited. As such, the collimated light corresponding to the first image and collimated and amplified by the collimating-amplifying subunit 315 is guided to the particular position through the waveguide unit 32, so that the viewer at the particular position can perceive the virtual image corresponding to the first image, wherein a size of the virtual image perceived is greater than a display size of the display component 10.

In addition, as shown in FIG. 5B, the collimating unit 31 in the adjustment optical component 30 according to the fifth exemplary embodiment of the present application further comprises a polarization beam splitting subunit 314, a polarization subunit 316, and a collimating-amplifying subunit 315. The first exit light from the transmission optical component 20 is a first polarized light, the first exit light firstly transmits through the polarization beam splitting subunit 314, the polarization beam splitting subunit 314 is a PBS (polarization beam splitter) element, the first polarized light is P-polarized light, and it fully transmits through the PBS element. The P-polarized light after transmitting through the PBS element enters the polarization subunit 316, the polarization subunit 316 is a ¼ wave plate, the first polarized light, which is the P-polarized light, passes through the ¼ wave plate and is converted into a second polarized light, which is circularly polarized light. Thereafter, the second polarized light enters the collimating-amplifying subunit 315, which may be for example configured with a set of reflectors and configured to amplify image and collimate the reflected second polarized light as parallel light. The collimating-amplifying subunit 315 collimates the second polarized light and reflects it back to the polarization subunit 316. The second polarized light again passes through the ¼ wave plate and is converted into a third polarized light, which is an S-polarized light. Last, the third polarized light is reflected out of the collimating unit 31 at the polarization beam splitting unit 314, which serves as the PBS element, as the collimated light corresponding to the first image. As such, the collimated light corresponding to the first image and collimated and amplified by the collimating-amplifying subunit 315 is guided to the particular position through the waveguide unit 32, so that the viewer at the particular position can perceive the virtual image corresponding to the first image, wherein a size of the virtual image perceived is greater than a display size of the display component 10.

In addition, when the first exit light from the transmission optical component 20 is the third polarized light (i.e., in the case of S-polarized light), a polarization subunit (not shown), which is a ½ wave plate, is further configured between the transmission optical component 20 and the polarization beam splitting subunit 314, and it converts the third polarized light into the first polarized light (i.e., P-polarized light). The subsequent configuration is the same as that shown in FIG. 5B, herein, repeated description is omitted.

Accordingly, in the display device according to the third exemplary embodiment of the present application, different than the configuration that the folded imaging light path between the first collimating subunit 311 and the second collimating subunit 312 is vertical to the direction of the incident light from the transmission optical component 20, in the display devices according to the fourth and fifth exemplary embodiments of the present application as shown in FIGS. 5A and 5B, the light path of the polarization beam splitting subunit 314 and the collimating-amplifying subunit 315 is parallel to the direction of the incident light from the transmission optical component 20, so that the thickness of the display device is reduced in the direction vertical to the incident light. In practical design, it is possible to select the light path configuration in the third exemplary embodiment as shown in FIG. 4 or in the fourth and fifth exemplary embodiments as shown in FIGS. 5A and 5B, according to specific requirements of the wearable device.

Figure 6:
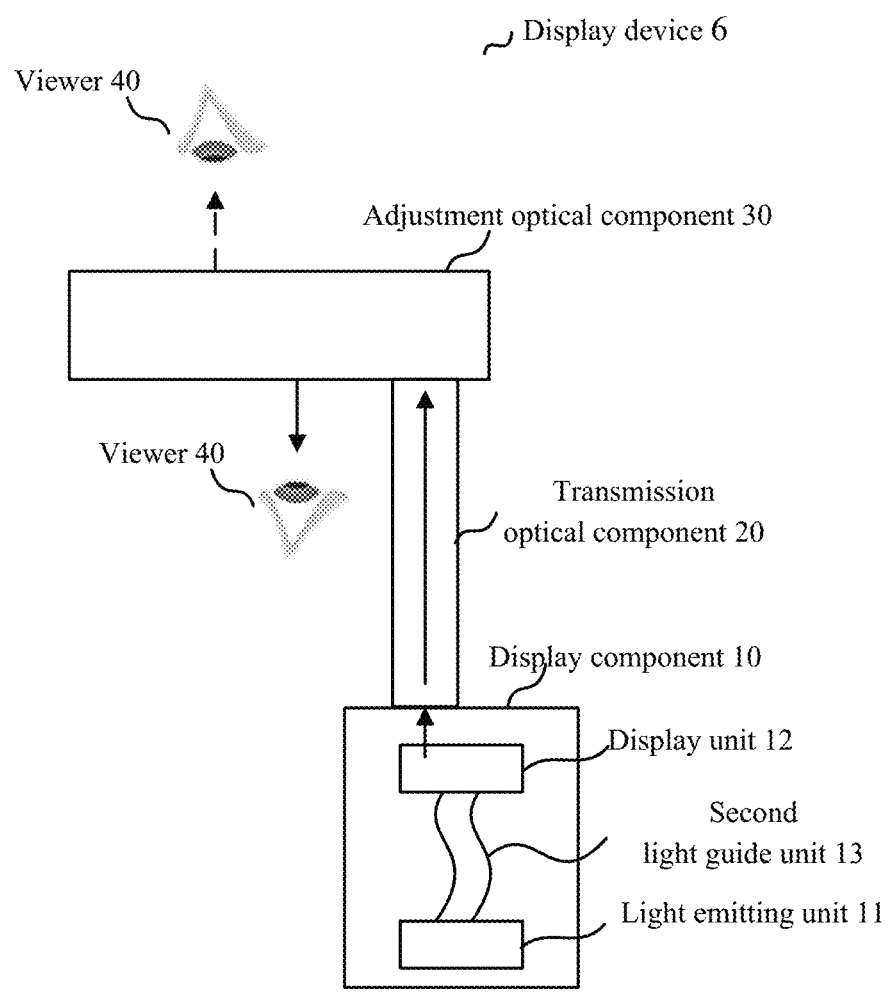
FIG. 6 is a structural block diagram illustrating a display device according to a sixth exemplary embodiment of the present application.

FIG. 6 is a structural block diagram illustrating a display device according to a sixth exemplary embodiment of the present application. Similar to the display device 1 according to an embodiment of the present application as briefly illustrated in FIG. 1, the display device 6 according to the sixth exemplary embodiment of the present application comprises a display component 10, a transmission optical component 20, and an adjustment optical component 30.

Specifically, the display component 10 comprises a light emitting unit 11, a display unit 12, and a second light guide unit 13. The light emitting unit 11 is configured to emit a backlight towards a first direction. The display unit 12 is provided within an irradiation area of the backlight, and configured to generate the initial light corresponding to the first image based on the first image. The second light guide unit 13 is provided between the light emitting unit 11 and the display unit 12 and configured to lead the light emitted by the light emitting unit 11 to the display unit 12. As such, the light emitting unit 11 and the display unit 12 may be provided separately, that is, they may be located at different positions that are separated by a specific distance in the whole device. In addition, the second light guide unit 13 may be configured with flexible material such as flexible fiber, so that the relative position between the light emitting unit 11 and the display unit 12 may be changed freely according to a different state of wearing.

Figure 7:
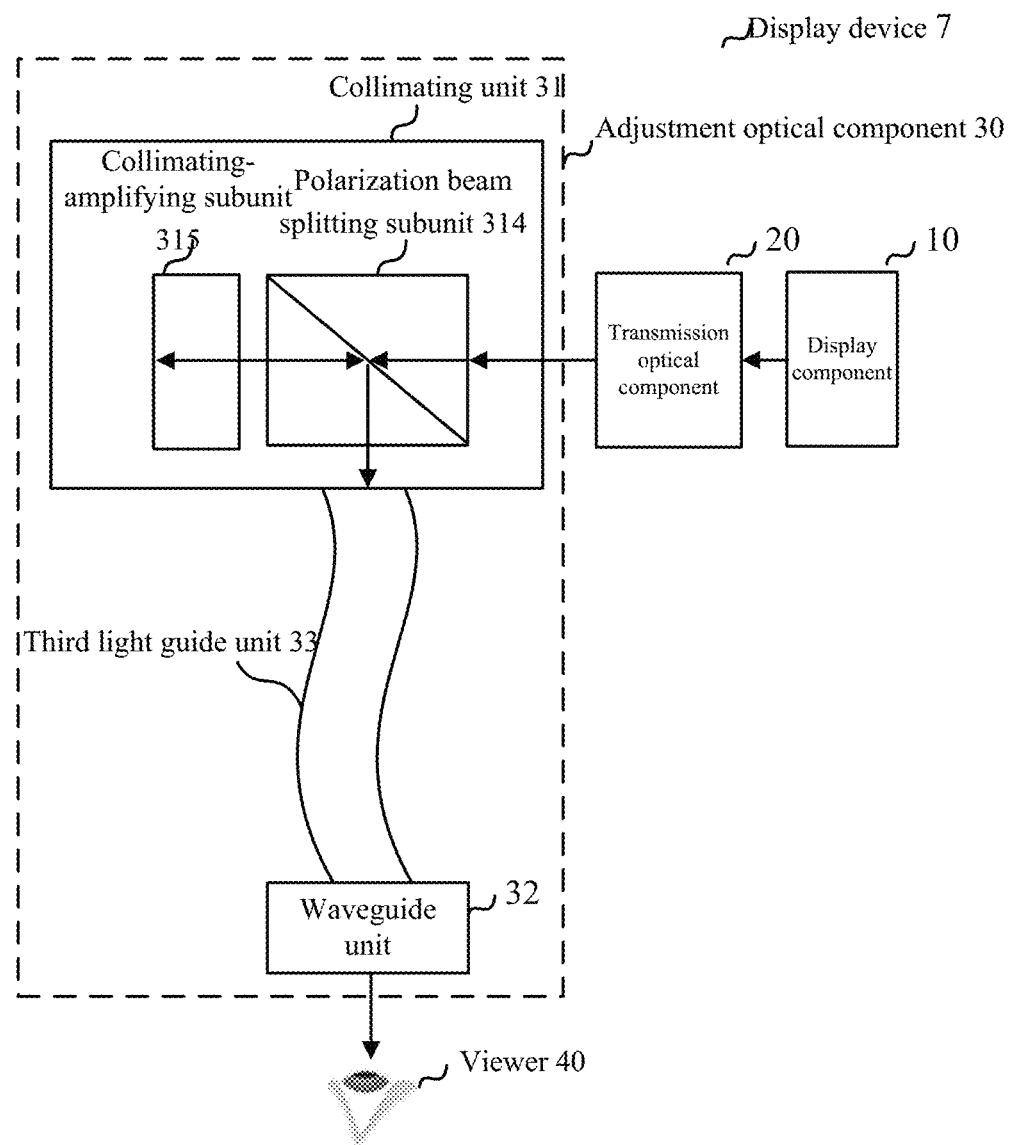
FIG. 7 is a structural block diagram illustrating a display device according to a seventh exemplary embodiment of the present application.

FIG. 7 is a structural block diagram illustrating a display device according to a seventh exemplary embodiment of the present application. Similar to the display device 1 according to an embodiment of the present application as briefly illustrated in FIG. 1, the display device 7 according to the seventh exemplary embodiment of the present application comprises a display component 10, a transmission optical component 20, and an adjustment optical component 30.

Specifically, the adjustment optical component 30 further comprises a third light guide unit 33 provided between the collimating unit 31 and the waveguide unit 32 and configured to lead the collimated light corresponding to the first image from the collimating unit 31 to the wave guide unit 22. As such, the collimating unit 31 and the waveguide unit 32 may be provided separately, that is, they may be located at different positions that are separated by a specific distance in the whole device. In addition, the third light guide unit 33 may be configured with flexible material such as flexible fiber, so that the relative position between the collimating unit 31 and the waveguide unit 32 may be changed freely according to a different state of wearing.

The display device according to the embodiments of the present application as described above may be applied to a wearable electronic apparatus such as smart glasses or HMD (head-mounted display), thus it is desired to further reduce the volume and weight of the display device. Hereinafter, the display component configuration schemes that aim to reduce the volume and weight of the display device will be further described with reference to FIGS. 8A to 12.

Figure 8A:
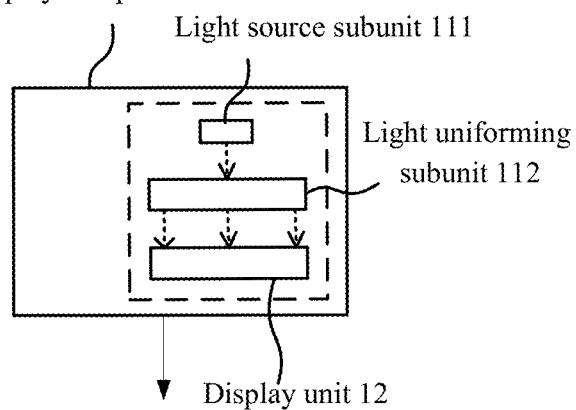
FIGS. 8A and 8B are block diagrams respectively illustrating a conventional display component and a display component in a display device according to a preferred embodiment of the present application.
Figure 8B:
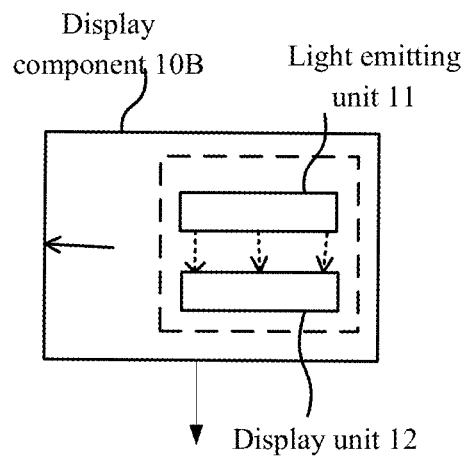

FIGS. 8A and 8B are block diagrams respectively illustrating a conventional display component and a display component in a display device according to a preferred embodiment of the present application. As shown in FIG. 8A, the conventional display component 10A specifically comprises a light source subunit 111, a light uniforming subunit 112, and a display unit 12, wherein the light uniforming subunit 112 sets the light source subunit 111 overlapped in an emission direction of the initial light corresponding to the first image, and uniforms a point light source emitted by the light source subunit 111 as backlight. Different than that, as shown in HG, 8B, in the display device 1 according to the embodiment of the present application, the display component 10B specifically comprises a light emitting unit 11 and a display unit 12. The light emitting unit 11 is configured to generate and emit plane backlight (light indicated by the dotted-line arrow shown in FIG. 8B). The display unit 12 is provided within an irradiation area of the backlight, and configured to generate the initial light corresponding to the first image based on the first image (e.g. light indicated by the solid-line arrow shown in FIG. 8B).

Therefore, in the display device according to the embodiment of the present application as shown in FIG. 8B, a combination manner of a single point light source and an optical light uniforming system as shown in FIG. 8A is replaced with a single light emitting unit 11 that emits plane backlight, so that thickness of the display component 10 in the display device according to the embodiment of the present application is reduced in the emission direction of the initial light corresponding to the first image.

Figure 9:
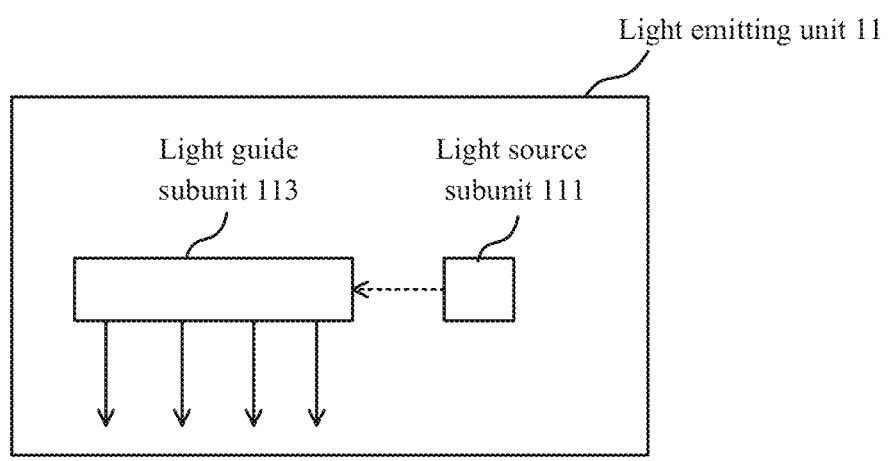
FIG. 9 is a block diagram illustrating a light emitting unit in a display device according to a preferred embodiment of the present application.

FIG. 9 is a structural block diagram illustrating a light emitting unit in a display device according to a preferred embodiment of the present application. The light emitting unit 11 as shown in FIG. 9 may be an implementation of the light emitting unit that emits plane backlight in the display device according to the embodiment of the present application as shown in FIG. 8B. The light emitting unit 11 in the display device according to the embodiment of the present application comprises a light source subunit 111 and a light guide subunit 113 in particular. Specifically, the light source subunit 111 is configured to emit light towards a second direction (light indicated by the dotted-line arrow shown in FIG. 9), the light guide subunit 113 is provided within an irradiation area of the light, the light transmits through the light guide subunit 113 to form the backlight (light indicated by the solid-line arrow shown in FIG. 9). That is, the light guide subunit 113 converts light emitted by the light source subunit 111 which serves as a single point light source into plane backlight. In a preferred embodiment of the present application, the light source subunit 111 may be an LED light source, and the light emitting unit 11 may further comprise an optical film. Thickness of the whole light emitting unit 11 is controlled for example within 1.5 mm, and the emission angle of the plane backlight converted by the light guide subunit 113 is controlled within 14 degrees, that is, an maximum angle between an exit direction of the backlight formed by the light guide subunit 113 and the second direction is 7 degrees. Therefore, the exit direction of the plane backlight converted by the light guide subunit 113 approximately can be considered as in the same direction (i.e., the second direction), which avoids the generation of stray light that exits towards a direction different than the second direction.

Therefore, in the light emitting unit 11 of the display device according to the embodiment of the present application, the light emission direction of the light source subunit 111 is different than the light emission direction of the light converted by the light guide subunit 113 (i.e., in a direction vertical to the emission direction of the backlight, the light source subunit 111 is provided at a side of the light guide subunit 113), so that in comparison with the case of providing the light source subunit and the light guide subunit overlapped in the emission direction of the backlight, thickness of the display component 10 is reduced in the emission direction of the initial light corresponding to the first image.

Figure 10:
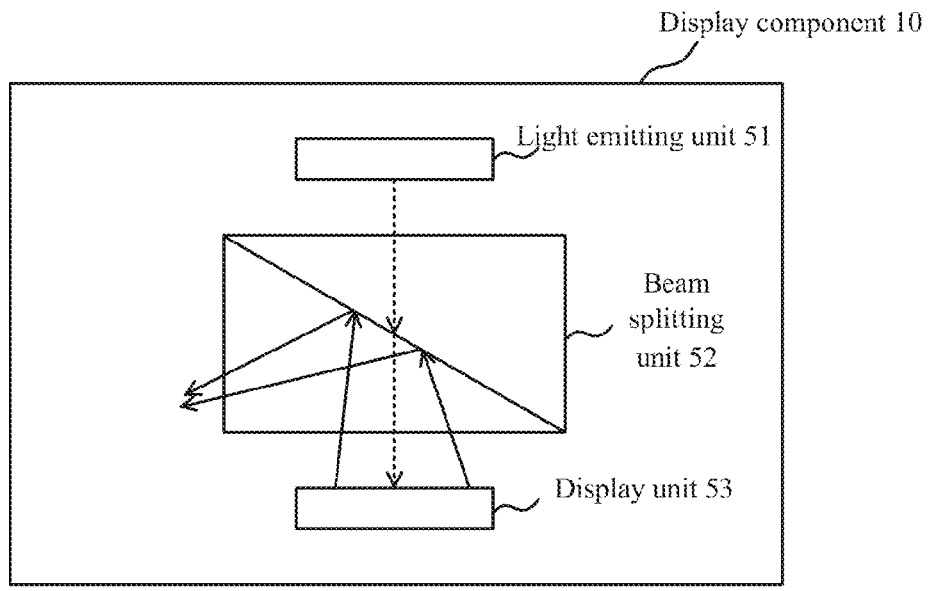
FIG. 10 is a structural block diagram illustrating a display component in a display device according to a preferred embodiment of the present application.

FIG. 10 is a structural block diagram illustrating a display component in a display device according to a preferred embodiment of the present application. As shown in FIG. 10, the display component 10 in the display device comprises a light emitting unit 51, a display unit 53, and a beam splitting unit 52. Specifically, the light emitting unit 51 is configured to emit backlight (light indicated by the dotted-line arrow shown in FIG. 10). As described above, the light emitting unit 51 may be a light emitting unit that emits plane backlight as described above with reference to FIGS. 8B and 12. The backlight from the light emitting unit 51 transmits through the beam splitting unit 52. In a preferred embodiment of the present application, the beam splitting unit 52 is a polarization beam splitter (PBS). P-polarized backlight emitted by the light emitting unit 51 transmits through the PSB that serves as the beam splitting unit 52, so as to illuminate the display unit 53. The display unit 53 is provided within an irradiation area of the backlight that transmits through the beam splitting unit 52, and configured to generate the initial light corresponding to the first image based on the first image (light indicated by the solid-line arrow shown in FIG. 10). Further, the initial light corresponding to the first image from the display unit 53 (after being modulated as S-polarized light) is reflected at the PBS which serves as the beam splitting unit 52, to be guided to the light path converting component via the beam splitting unit 52.

Figure 11:
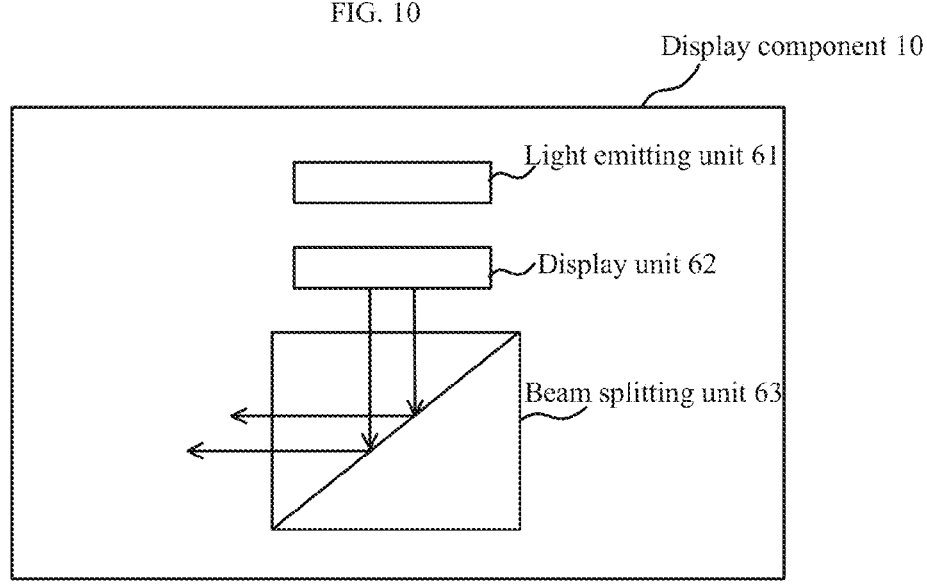
FIG. 11 is a structural block diagram illustrating a display component in a display device according to a preferred embodiment of the present application.

FIG. 11 is a structural block diagram illustrating a display component in a display device according to a preferred embodiment of the present application. As shown in FIG. 11, the display component 10 in the display device comprises alight emitting unit 61, a display unit 62, and a beam splitting unit 63. Specifically, the display unit 62 is configured to generate a display signal corresponding to the first image based on the first image. The light emitting unit 61 is configured to generate the initial light corresponding to the first image based on the display signal. That is, the light emitting unit 61 and the display unit 62 in the display device according to the sixth exemplary embodiment of the present application may be implemented as a self-luminous type OLED display device, the display unit 62 is a control unit that generates a display drive signal based on the first image to be displayed, the light emitting unit 61 is a self-luminous layer that executes emitting display based on the received display drive signal. Similar to the case described with reference to FIG. 11, the beam splitting unit 63 is configured to guide the initial light corresponding to the first image from the light emitting unit 61 to the light path converting component. In a preferred embodiment of the present application, the beam splitting unit 63 is a polarization beam splitter (PBS).

Therefore, in the display component 10 of the display device according to an embodiment of the present application, the display unit and the light emitting unit are integrally provided on one side of the beam splitting unit, so that a size of the display device in the direction of generating the initial light is smaller than a size of display device in the direction of generating the initial light in the case where the display unit and the light emitting unit are integrally provided on both sides of the beam splitting unit (the case shown with reference to FIG. 11).

Figure 12:
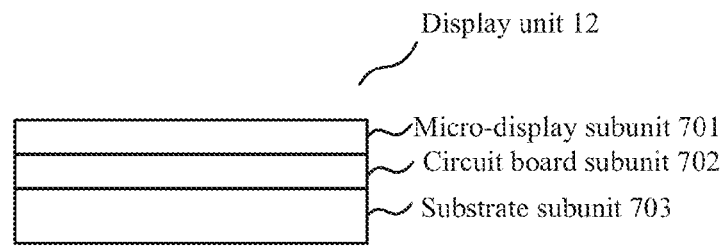
FIG. 12 is a structural block diagram illustrating a display unit in a display device according to a preferred embodiment of the present application.

FIG. 12 is a structural block diagram illustrating a display unit in a display device according to an embodiment of the present application. The display unit 12 shown in FIG. 12 may be applied to the display component described with reference to FIGS. 8A to 11. As shown in FIG. 12, the display unit 12 comprises a micro-display subunit 701, a circuit board subunit 702, and a substrate subunit 703. Specifically, the micro-display subunit 701 is configured with an array of a plurality of pixel cells, each pixel cell being used for generating the initial light corresponding to the first image. The circuit board subunit 702 is configured to provide a control signal based on the first image to control the pixel cells in the micro-display subunit 701 to generate the initial light corresponding to the first image. The substrate subunit 703 is configured to arrange the micro-display subunit 701 and the circuit board subunit 702 thereon. Flexural strength and fracture toughness of the substrate subunit 703 may be denoted by the following equations:

$$\sigma_f = \sqrt{\frac{2E\gamma_f}{C}} \quad \text{(Equation 1)}$$

$$K_{ZC} = \sqrt{2Z\gamma_f} \quad \text{(Equation 2)}$$

where $\sigma_f$ is flexural strength, $K_{ZC}$ is fracture toughness, E is elastic modulus, $\gamma_f$ is fracture energy, and C is crack size. As can be seen from the above Equations 1 and 2, in order to improve strength of the material, fracture energy and elastic modulus must be increased, to reduce fracture size. To achieve toughness of the material, fracture energy and elastic modulus must be increased. It is known that the substrate subunit is typically made from metal material like aluminum, which always reaches a thickness of 1.6 mm. Elastic modulus of the non-metallic material, like ceramic material, is much larger than that of the metals, often higher by one to several times.

Thus, in the display unit of the display device according to an embodiment of the present application, the substrate subunit 703 is made from non-metallic material that satisfies a predetermined intension, so that thickness of the substrate subunit is lower than that of the substrate subunit 703 made from metallic material that satisfies a predetermined intension (e.g., as low as 0.25 mm).

In the above, the display device according to the embodiments of the present application is described with reference to FIGS. 1 to 12. Hereinafter, an electronic apparatus to which the display device according to the embodiments of the present application is applied will be further described.

An electronic apparatus to which the display device according to the embodiments of the present application is applied may be any electronic apparatus that comprises a display device, it may be a wearable electronic apparatus or any ocher type of electronic apparatus. In the case where the electronic apparatus is a wearable electronic apparatus, the electronic apparatus comprises a body device and a fixing device connected with the body device and configured to fix a position relationship relative to a user of the electronic apparatus. Further, in the case where the electronic apparatus is a head-mounted electronic apparatus, the fixing device may have a corresponding support component according to the shape of the head-mounted electronic apparatus (e.g., the head-mounted electronic apparatus is smart glasses or a helmet-type display). For example, in the case of the smart glasses, the fixing device is two support components connected at both ends of the smart glasses (i.e., glass legs and nose holder), or three support components connected at both ends and in the middle of the smart glasses (i.e., glass legs and nose holder and glass frame), so that the glass legs located at two ends of the space and the nose holder located in the middle of the space form an approximate rectangular space for surrounding a person's head. When the user wears the helmet-type electronic apparatus, a visible area of the display device is set within the region of the user's eye, so that the emission direction of the display device is towards the user's eyes. Descriptions will be provided below in further detail with reference to the accompanying drawings.

Figure 13A:
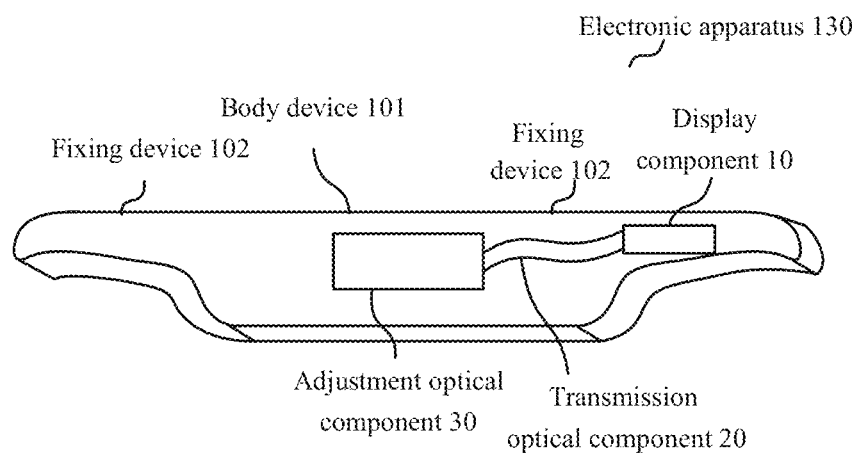
FIGS. 13A and 13B are schematic diagrams illustrating an electronic apparatus according to an embodiment of the present application.
Figure 13B:
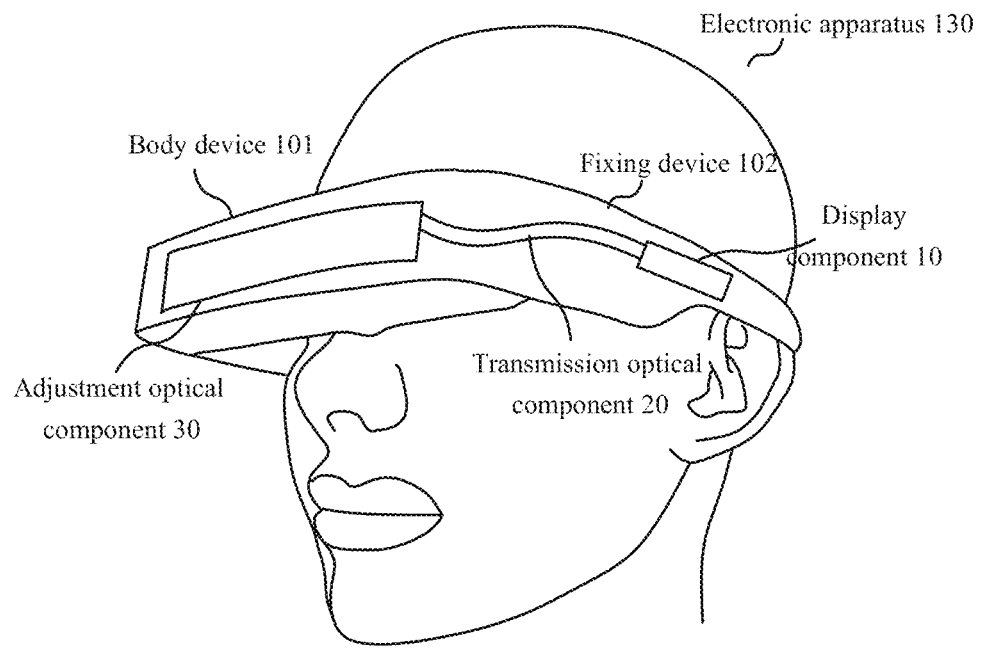

FIGS. 13A and 13B are schematic diagrams illustrating an electronic apparatus according to an embodiment of the present application. The electronic apparatus 130 according to the embodiment of the present application comprises a body device 101, a fixing device 102, and a display device 103. Specifically, the body device 101 comprises a processing unit (not shown) configured to generate a first image to be displayed and execute display control. The fixing device 102 is connected with the body device and configured to fix a position relationship relative to a user of the electronic apparatus 130; and the display device 103 is provided within the body device and/or the fixing device. The display device 103 may be the display device described above with reference to FIGS. 1 to 12, and comprise a display component 10, a transmission optical component 20, and an adjustment optical component 30. The display component 10 is configured to output initial light corresponding to the first image. The transmission optical component 20 is at least partially provided within an irradiation area of the initial light and configured to transmit the initial light corresponding to the first image from the display component 10 and perform light path conversion to convert it into a first exit light. The adjustment optical component 30 is at least partially provided within an irradiation area of the first exit light and configured to perform light path conversion on the first exit light to obtain a second exit light, so that a viewer 40 at a particular position perceives a virtual image corresponding to the first image.

As shown in FIG. 13A, with the transmission optical component 20 being configured, the display component 10 is located at a first position in the electronic apparatus 130, the adjustment optical component 30 is located at a second position in the electronic apparatus 130, there is a separation between the first position and the second position. In the case as shown in FIG. 13A, the display component 10 is located within the fixing device 102 of the electronic apparatus 130, whereas the adjustment optical component 30 is located within the body device 101 of the electronic apparatus 130. The present application is not limited thereto, the display component 10 may be located within the body device 101 of the electronic apparatus 130, whereas the adjustment optical component 30 may be located within the fixing device 102 of the electronic apparatus 130. As such, the display device 103 can be configured at different positions of the electronic apparatus 130, rather than being configured integrally in the electronic apparatus. Besides, the transmission optical component 20 may comprise a converging unit and a first light guide unit (not shown), the converging unit is configured to narrow an initial beam diameter of the initial light corresponding to the first image from the display component 10 as a first beam diameter, the first light guide unit guides the first exit light having the first beam diameter to the adjustment optical component 30. As such, the converging unit enables that a diameter or an entire volume of the portions ocher than the display component 10 and the adjustment optical component 30 can be reduced notably in the electronic apparatus 30 according to the exemplary embodiment of the present application.

Similar co FIG. 13A, FIG. 13B also illustrates the electronic apparatus 130 according to an embodiment of the present application. FIG. 13A shows a first state (not being worn) of the electronic apparatus 130, whereas FIG. 13B shows a second state (being worn) of the electronic apparatus 130. As shown in FIGS. 13A and 13B, when switching from the first state to the second state, the body device 101 and the fixing device 102 can move relatively, when the display component 10 and the adjustment optical component 30 are provided within the body device 101 and the fixing device 102, respectively, by configuring the flexible transmission optical component 20, the display component 10 and the adjustment optical component 30 can be located ac different relative positions according to change of the using state of the electronic apparatus 130.

In the above, the display device and the electronic apparatus using the display device according to the embodiments of the present application are described with reference to FIGS. 1 to 13B. The display device and the electronic apparatus using the display device according to the embodiments of the present application can reduce the volume and weight of the display device, and distribute layouts of the respective components in the display device in accordance with human engineering so as to achieve an overlapped proper distribution, thus providing the user with more comfortable wearing experience.

It should be noted that, in the specification, the terms "comprise", "comprise" and any other variations thereof intend to cover nonexclusive inclusion so that the procedure, the method, the product or the equipment including a series of elements comprise not only these elements, but also other elements which are not listed explicitly, or also comprise inherent elements of these procedure, method, product or equipment. In the case that there is no further limitation, elements defined by the expressions "comprises one . . . " do not exclude there being additional identity elements in the procedure, method, product or equipment of the elements.

Finally, it should be noted that, the above-described series of processings not only comprise processings executed chronologically in the order mentioned here, and also comprise processings executed in parallel or individually but not chronologically.

Through the above description of the implementations, a person skilled in the art can clearly understand that the present disclosure may be implemented in a manner of software plus a necessary hardware platform, and of course the present disclosure may also be implemented fully by hardware. Based on such understanding, the technical solution of the present disclosure that contributes to the background art may be embodied in whole or in part in the form of a software product. The computer software product may be stored in a storage medium, such as ROM/RAM, disk, CD-ROM, and comprise several instructions for causing a computer apparatus (which may be a personal computer, a server, or a network device) to perform the method described in the various embodiments of the present disclosure or certain parts thereof.

Although the present disclosure has been described in detail in the above, specific examples are applied in this text to demonstrate the principles and implementations of the present disclosure, these descriptions of the above embodiments are only to help understand the method of the present disclosure and its core concept. Meanwhile, for a person with ordinary skill in the art, depending on the concepts of the present disclosure, modifications may be made to the specific implementations and applications. To sum up, contents of this specification should not be construed as limiting the present disclosure.

The invention claimed is:

1. A display device, comprising:
a display component configured to output initial light corresponding to a first image;
a transmission optical component at least partially provided within an irradiation area of the initial light and configured to transmit the initial light corresponding to the first image from the display component and perform light path conversion to convert it into a first exit light; and
an adjustment optical component at least partially provided within an irradiation area of the first exit light and configured to perform light path conversion on the first exit light to obtain a second exit light, wherein an image corresponding to the first image is capable of being perceived at a particular position,
wherein the adjustment optical component comprises a collimating unit configured to collimate the first exit light from the transmission optical component into collimated light corresponding to the first image.

2. The display device according to claim 1, wherein the transmission optical component comprises a converging unit and a first light guide unit, the converging unit is configured to narrow an initial beam diameter of the initial light corresponding to the first image from the display component as a first beam diameter, the first light guide unit guides the first exit light having the first beam diameter to the adjustment optical component.

3. The display device according to claim 1, wherein the transmission optical component enables the display component and the adjustment optical component to be located at different relative positions.

4. The display device according to claim 1, wherein the adjustment optical component further comprises a waveguide unit,
the waveguide unit guides the collimated light corresponding to the first image from the collimating unit to the particular position,
wherein the collimated light corresponding to the first image is for forming a virtual image corresponding to the first image, and a size of the virtual image is greater than a display size of the display component.

5. The display device according to claim 4, wherein the collimating unit comprises a first collimating subunit and a second collimating subunit provided opposite to each other, and a polarization beam splitting subunit provided between the first collimating subunit and the second collimating subunit, the first exit light is reflected by the polarization beam splitting subunit to the first collimating subunit, thereafter it is collimated by the first collimating subunit and the second collimating subunit, and exited by the polarization beam splitting unit as the collimated light corresponding to the first image.

6. The display device according to claim 4, wherein the collimating unit comprises a polarization beam splitting subunit and a collimating-amplifying subunit, the first exit light transmits through the polarization beam splitting subunit, is collimated by the collimating-amplifying subunit, and thereafter is reflected by the polarization beam splitting subunit as the collimated light corresponding to the first image to be exited.

7. The display device according to claim 1, wherein the display component comprises:
a light emitting unit configured to emit backlight towards a first direction; and
a display unit provided within an irradiation area of the backlight, and configured to generate the initial light corresponding to the first image based on the first image,
wherein the display component further comprises a second light guide unit provided between the light emitting unit and the display unit and configured to lead the light emitted by the light emitting unit to the display unit.

8. The display device according to claim 4, wherein the adjustment optical component further comprises a third light guide unit provided between the collimating unit and the waveguide unit and configured to lead the collimated.

9. An electronic apparatus comprising:
a body device that comprises a processing unit configured to generate a first image to be displayed and configured to execute display control;
a fixing device connected with the body device and configured to fix a position relationship relative to a user of the electronic apparatus; and
a display device provided within the body device and/or the fixing device,
wherein the display device comprises:
a display component configured to output initial light corresponding to the first image;
a transmission optical component at least partially provided within an irradiation area of the initial light and configured to transmit the initial light corresponding to the first image from the display component and perform light path conversion to convert it into a first exit light; and
an adjustment optical component at least partially provided within an irradiation area of the first exit light and configured to perform light path conversion on the first exit light to obtain a second exit light, wherein an image corresponding to the first image is capable of being perceived at a particular position,
wherein the display component is located at a first position in the electronic apparatus, the adjustment optical component is located at a second position in the electronic apparatus and there is a separation between the first position and the second position, and
wherein the adjustment optical component comprises a collimating unit configured to collimate the first exit light from the transmission optical component into collimated light corresponding to the first image.

10. The electronic apparatus according to claim 9, wherein the transmission optical component comprises a converging unit and a first light guide unit, the converging unit is configured to narrow an initial beam diameter of the initial light corresponding to the first image from the display component as a first beam diameter, the first light guide unit guides the first exit light having the first beam diameter to the adjustment optical component.

11. The electronic apparatus according to claim 10, wherein the transmission optical component enables the display component and the adjustment optical component to be located at different relative positions.

12. The electronic apparatus according to claim 9, wherein the body device and the fixing device can move relatively, the first position and the second position are located within the fixing device and the body device, respectively.

* * * * *